United States Patent
Yamamoto et al.

(10) Patent No.: US 12,248,332 B2
(45) Date of Patent: Mar. 11, 2025

(54) PEDAL DEVICE

(71) Applicant: DENSO CORPORATION, Kariya (JP)

(72) Inventors: Takao Yamamoto, Kariya (JP);
Daisuke Hokuto, Kariya (JP); Etsugo Yanagida, Kariya (JP); Yasuhisa Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/454,630

(22) Filed: Aug. 23, 2023

(65) Prior Publication Data

US 2023/0393607 A1 Dec. 7, 2023

Related U.S. Application Data

(63) Continuation of application No. PCT/JP2022/005056, filed on Feb. 9, 2022.

(30) Foreign Application Priority Data

Feb. 25, 2021 (JP) .................. 2021-029096

(51) Int. Cl.
*G05G 5/04* (2006.01)
*G05G 1/38* (2008.04)
(Continued)

(52) U.S. Cl.
CPC .............. *G05G 5/04* (2013.01); *G05G 1/38* (2013.01); *G05G 1/44* (2013.01); *G05G 5/05* (2013.01);
(Continued)

(58) Field of Classification Search
CPC ...................................... G05G 5/04
See application file for complete search history.

(56) References Cited

U.S. PATENT DOCUMENTS

2006/0053957 A1* 3/2006 Ewel ............... F02D 11/02
74/560
2018/0253120 A1 9/2018 Kim et al.
(Continued)

FOREIGN PATENT DOCUMENTS

JP 54-53216 4/1979
JP 2006-188161 7/2006
(Continued)

OTHER PUBLICATIONS

U.S. Appl. No. 18/454,564 to Hokuto et al., filed Aug. 23, 2023 ( pages).

(Continued)

*Primary Examiner* — Vicky A Johnson
(74) *Attorney, Agent, or Firm* — Nixon & Vanderhye P.C.

(57) ABSTRACT

An organ-type pedal device includes a housing attached to a vehicle body. A pedal pad of the pedal device is provided rotatably about a predetermined rotation axis with respect to the housing, and a stepped portion of the pedal pad is arranged above the rotation axis in a vertical direction of the vehicle. The pedal pad rotates in a forward direction in accordance with an increase of a pedaling force of the driver, and rotates in a backward direction in accordance with a decrease of the pedaling force of the driver. A sensor unit outputs an electric signal corresponding to a rotation angle of the pedal pad. A full-close stopper comes in contact with a lower part of the pedal pad with respect to the rotation axis, and prevents the pedal pad from rotating in the backward direction when the pedaling force of the driver is not applied thereto.

21 Claims, 12 Drawing Sheets

(51) Int. Cl.
*G05G 1/44* (2008.04)
*G05G 5/05* (2006.01)
*B60K 26/02* (2006.01)
*B60T 7/04* (2006.01)

(52) U.S. Cl.
CPC .............. *B60K 26/02* (2013.01); *B60T 7/042* (2013.01); *G05G 2505/00* (2013.01)

(56) References Cited

U.S. PATENT DOCUMENTS

| | | |
|---|---|---|
| 2019/0163227 A1 | 5/2019 | Kadoi |
| 2021/0300180 A1 | 9/2021 | Kihara et al. |
| 2023/0393607 A1 | 12/2023 | Yamamoto et al. |

FOREIGN PATENT DOCUMENTS

| | | |
|---|---|---|
| JP | 2011-60099 | 3/2011 |
| JP | 2015-81023 | 4/2015 |
| JP | 2017049892 A | 3/2017 |
| JP | 2019-67005 | 4/2019 |
| WO | 2022181327 A1 | 9/2022 |
| WO | 2022181328 A1 | 9/2022 |
| WO | 2022181329 A1 | 9/2022 |

OTHER PUBLICATIONS

U.S. Appl. No. 18/454,647 to Hokuto et al., filed Aug. 23, 2023 ( pages).

\* cited by examiner

PEDAL DEVICE

CROSS REFERENCE TO RELATED APPLICATIONS

The present application is a continuation application of International Patent Application No. PCT/JP2022/005056 filed on Feb. 9, 2022, which designated the U.S. and claims the benefit of priority from Japanese Patent Application No. 2021-029096 filed on Feb. 25, 2021. The entire disclosures of all of the above applications are incorporated herein by reference.

TECHNICAL FIELD

The present disclosure relates to an organ-type pedal device mounted on a vehicle.

BACKGROUND

Conventionally, there has been known an organ-type pedal device used as an accelerator pedal device, a brake pedal device, or the like.

In the pedal device, an initial angle (that is, a full-close angle) of a pedal pad is defined by a contact between components having a complicated configuration, thereby having an increased variation of the initial angle of the pedal pad.

SUMMARY

According to an aspect of the present disclosure, an organ-type pedal device includes a housing, a pedal pad, a sensor unit, and a full-close stopper. The housing is attached to a vehicle body. The pedal pad is provided rotatably about a predetermined rotation axis with respect to the housing, and a stepped portion to be stepped on by a driver is arranged above the rotation axis in a vertical direction when the pedal device is mounted on the vehicle. The pedal pad is configured to rotate in a forward direction with an increase of a pedaling force of the driver, and to rotate in a backward direction with a decrease of the pedaling force of the driver. The sensor unit is configured to output an electric signal corresponding to a rotation angle of the pedal pad. The full-close stopper is provided at a portion of an outer wall of the housing close to the driver with respect to the rotation axis, and is configured to come into contact with a lower part of the pedal pad in the vertical direction of the vehicle to prevent the pedal pad from rotating in the backward direction, when the pedaling force of the driver is not applied to the pedal pad.

BRIEF DESCRIPTION OF THE DRAWINGS

Objects, features, and advantages of the present disclosure will become more apparent from the following detailed description made with reference to the accompanying drawings, in which.

DESCRIPTION OF EMBODIMENTS

Figure 1:
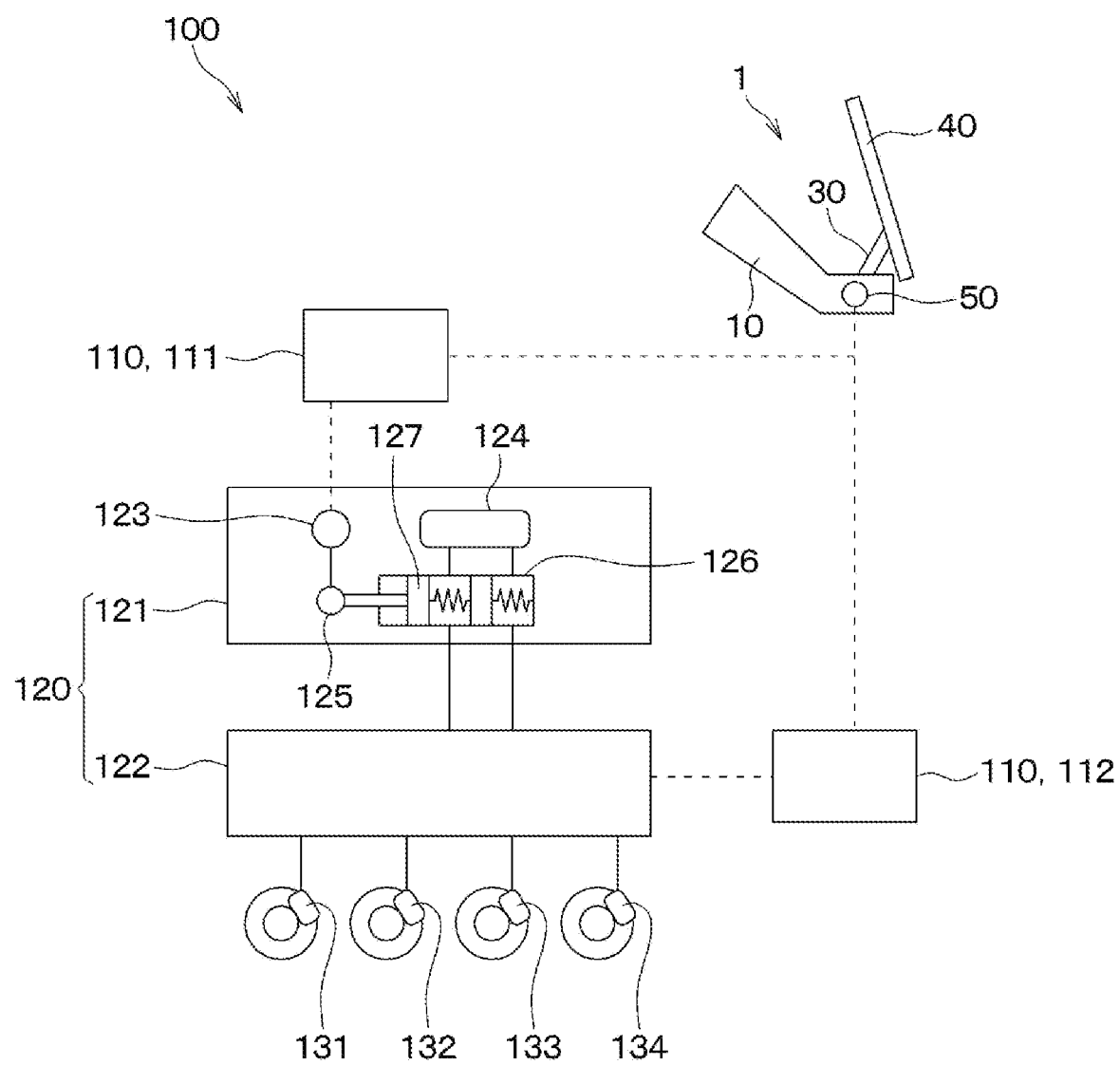
FIG. 1 is a configuration diagram of a brake-by-wire system using a pedal device according to a first embodiment.

In an organ-type pedal device, a portion of a pedal pad that is stepped on by a driver may be arranged above the center of rotation (hereinafter referred to as "rotation axis") in a vertical direction when the pedal device is mounted on a vehicle.

The pedal device may include a rod extending from a rear surface of the pedal pad into a housing, and a member called as a stopper provided at a portion of the rod inside the housing. This pedal device may include a member called as a restrictor provided at a position corresponding to the stopper on an inner wall of the housing. In this pedal device, an initial angle (that is, a full-close angle) of the pedal pad may be defined by a contact between the stopper and the restrictor in a state where a pedaling force of the driver is not applied to the pedal pad. Further, this pedal device may be configured such that a sensor unit provided inside the housing outputs an electric signal corresponding to a rotation angle of the pedal pad to an electronic control unit (hereinafter referred to as an ECU) of the vehicle. ECU is an abbreviation of Electronic Control Unit.

In this case, the pedal device has a complicated configuration for defining the initial angle of the pedal pad, and the number of parts is large, thereby having a large amount of manufacturing tolerance, as well as an increased variation of the initial angle of the pedal pad. Here, a direction in which the pedal pad rotates as the driver's pedaling force increases is called as a forward direction, and a direction in which the pedal pad rotates as the driver's pedaling force decreases is called as a backward direction. When an actual initial angle of the pedal pad deviates in the forward direction from a designed initial angle of the pedal pad, the sensor unit outputs a signal indicating that the pedal pad is being rotated when the driver is not applying any force to the pedal pad. Alternatively, when the actual initial angle of the pedal pad deviates in the backward direction from the designed initial angle of the pedal pad, the sensor unit outputs, with a delay, a signal indicating that the pedal pad has rotated when the driver starts to apply the pedaling force to the pedal pad. Therefore, it may be difficult for the pedal device to accurately perform vehicle control such as hydraulic control of a brake circuit or lighting of a brake lamp.

It is an object of the present disclosure to suppress variation in an initial angle (that is, a full-close angle) of a pedal pad in an organ-type pedal device.

According to an aspect of the present disclosure, an organ-type pedal device mounted on a vehicle includes a housing, a pedal pad, a sensor unit, and a full-close stopper. The housing is attached to a vehicle body. The pedal pad is provided rotatably about a predetermined rotation axis with respect to the housing, and a stepped portion to be stepped on by a driver is arranged above the rotation axis in a vertical direction when the pedal device is mounted on the vehicle. The pedal pad is configured to rotate in a forward direction with an increase of a pedaling force of the driver, and to rotate in a backward direction with a decrease of the pedaling force of the driver. The sensor unit is configured to output an electric signal corresponding to a rotation angle of the pedal pad. the full-close stopper is provided at a portion of an outer wall of the housing close to the driver with respect to the rotation axis, and is configured to come into contact with a lower part of the pedal pad in the vertical direction of the vehicle to prevent the pedal pad from rotating in the backward direction, when the pedaling force of the driver is not applied to the pedal pad.

According to the above, it is possible to have a simple structure in which the full-close stopper and the pedal pad are made to be in direct contact with each other, and to have a low manufacturing tolerance due to small number of parts, thereby making assembly and adjustment of parts to be easy. Therefore, the pedal device can suppress product variations in the initial angle of the pedal pad for each product, and can accurately define the initial angle of the pedal pad. Thus, the pedal device prevents an error from occurring in the electric signal output from the sensor unit when the driver is not applying the pedaling force to the pedal pad and when an application of the pedaling force thereto is started, thereby realizing an accurate vehicle control. Further, in the pedal device, since the full-close stopper is provided at the outer wall of the housing, it is easy to visually check whether or not there is contact between these parts and the pedal pad during manufacturing, inspection, maintenance, or the like.

Embodiments of the present disclosure are now described with reference to the drawings. Parts that are identical or equivalent to each other in the following embodiments have the same reference numerals assigned thereto and redundant description thereof is not provided.

First Embodiment

The pedal device of the first embodiment is shown in FIGS. 1 to 11. A pedal device 1 of the present embodiment is an organ-type pedal device 1 that is mounted on a vehicle and step-on operation is performed by a driver of the vehicle with a pedaling force of a driver. The organ-type pedal device 1 has a configuration in which a portion of the pedal pad 40 that is stepped on by the driver is arranged above a center of rotation (hereinafter referred to as a "rotation axis CL") in the vertical direction when the pedal device 1 is mounted on the vehicle. Such an organ-type pedal device 1 is used as an accelerator pedal device, a brake pedal device, or the like. In the present embodiment, a brake pedal device will be described as an example of the pedal device 1.

First, a brake-by-wire system 100 using the pedal device 1 of the present embodiment is described.

As shown in FIG. 1, the brake-by-wire system 100 is a system in which an electronic control unit 110 (hereinafter referred to as "ECU 110") mounted on the vehicle controls a brake circuit 120 based on an electric signal output from a sensor unit 50 of the pedal device 1. Under drive control of the ECU 110, the brake circuit 120 generates hydraulic pressure necessary for braking the vehicle to drive wheel cylinders 131 to 134.

In the brake-by-wire system 100 illustrated in FIG. 1, the ECU 110 is composed of a first ECU 111 and a second ECU 112. The brake circuit 120 is composed of a first brake circuit 121 and a second brake circuit 122.

An electric signal output from the sensor unit 50 of the pedal device 1 is transmitted to the first ECU 111 and the second ECU 112. The first ECU 111 has a microcontroller, a drive circuit, and the like (not shown). The first ECU 111 supplies electric power to a motor 123 of the first brake circuit 121 and the like to drive and control the first brake circuit 121. The second ECU 112 also has a microcontroller and a drive circuit (not shown). The second ECU 112 drives and controls an electromagnetic valve, a motor, and the like (not shown) of the second brake circuit 122.

The first brake circuit 121 has a reservoir 124, a motor 123, a gear mechanism 125, a master cylinder 126, and the like. The reservoir 124 stores brake fluid. The motor 123 drives the gear mechanism 125. The gear mechanism 125 reciprocates a master piston 127 of the master cylinder 126 in the axial direction of the master cylinder 126. Movement of the master piston 127 increases the hydraulic pressure of the brake fluid supplied from the reservoir 124 to the master cylinder 126, and the hydraulic pressure is supplied from the first brake circuit 121 to the second brake circuit 122.

The second brake circuit 122 is a circuit for performing a normal control, an ABS control, a VSC control, etc. by controlling the hydraulic pressure of each of the wheel cylinders 131 to 134 according to a control signal from the second ECU 112. ABS stands for Anti-lock Braking System, and VSC stands for Vehicle Stability Control. The wheel cylinders 131 to 134 provided respectively for wheels drive brake pads provided for respective wheels.

When the driver of the vehicle performs a step-on operation on the pedal pad 40 of the pedal device 1, a signal corresponding to a rotation angle of the pedal pad 40 is output from the sensor unit 50 to the first ECU 111 and the second ECU 112. The first ECU 111 drives the motor 123 to decelerate the vehicle. As a result, when a rotation speed of the motor 123 increases, the master cylinder 126 increases a pressure of a brake fluid supplied from the reservoir 124. The hydraulic pressure of the brake fluid is transmitted from the first brake circuit 121 to the second brake circuit 122.

The second ECU 112 performs a normal control, an ABS control, a VSC control, and the like. For example, the second ECU 112 controls driving of a solenoid valve of the second brake circuit 122 in the normal control for braking according to the operation of the pedal pad 40 by the driver. The second ECU 112 then causes the hydraulic pressure supplied from the first brake circuit 121 to be supplied to the wheel cylinders 131 to 134 via the second brake circuit 122. Therefore, the brake pads respectively driven by the wheel cylinders 131 to 134 come into frictional contact with the corresponding brake discs, braking the wheels, thereby decelerating the vehicle.

Also, for example, the second ECU 112 calculates a slip ratio of each of the wheels based on a speed of each of the wheels of the vehicle and a vehicle speed, and performs the ABS control. Also, for example, the second ECU 112 calculates a sideslip state of the vehicle based on a yaw rate, a steering angle, an acceleration, a speed of each wheel, a vehicle speed, and the like, and performs the VSC control.

Note that the second ECU 112 may perform a collision avoidance control, a regenerative cooperation control, and the like based on signals from other ECUs (not shown).

Next, the pedal device 1 is explained. As shown in FIGS. 2 to 7, the pedal device 1 includes a housing 10, a pedal pad 40, a sensor unit 50, a full-open stopper 70, a full-close stopper 71, and the like.

The housing 10 has a housing body 11 and a housing cover 12. An outer wall of the housing body 11 is provided with a first recess 13 for mounting the full-open stopper 70 and a second recess 14 for mounting the full-close stopper 71. The first recess 13 is provided on the outer wall of the housing body 11 facing the pedal pad 40 at a portion away from the driver with respect to the rotation axis CL of the pedal pad 40 (that is, a portion close to a front of the vehicle). Specifically, the first recess 13 is provided at a position as far as possible from the rotation axis CL of the pedal pad 40 on the outer wall of the housing body 11 facing the pedal pad 40. On the other hand, the second recess 14 is provided at a portion close to the driver with respect to the rotation axis CL of the pedal pad 40 (that is, a portion close to a rear of the vehicle) on the outer wall of the housing body 11 facing the pedal pad 40. The full-open stopper 70 and the full-close stopper 71 attached to the first recess 13 and the second recess 14 are described later.

Figure 4:
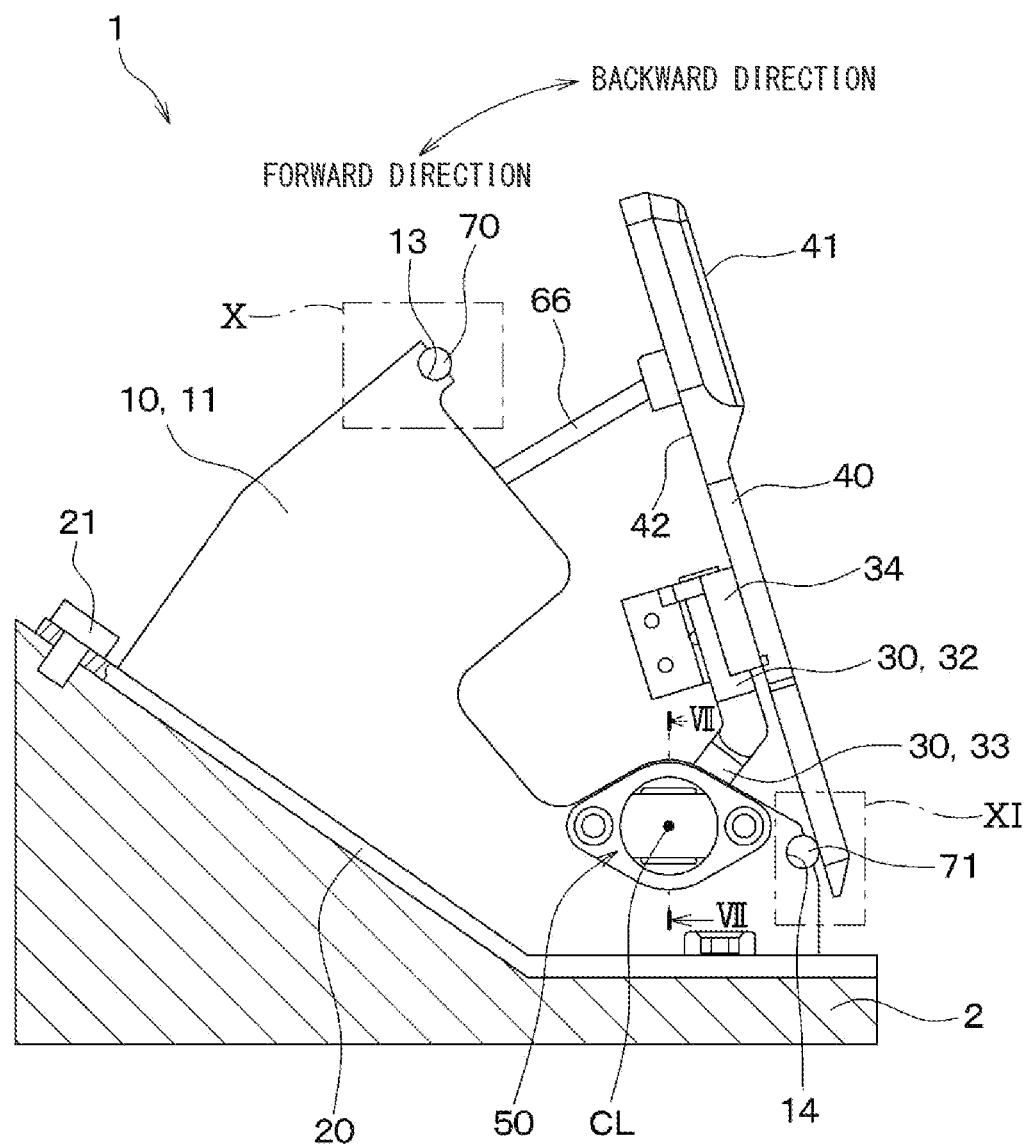
FIG. 4 is a left side view of the pedal device when being viewed in a direction IV of FIG. 3.
Figure 5:
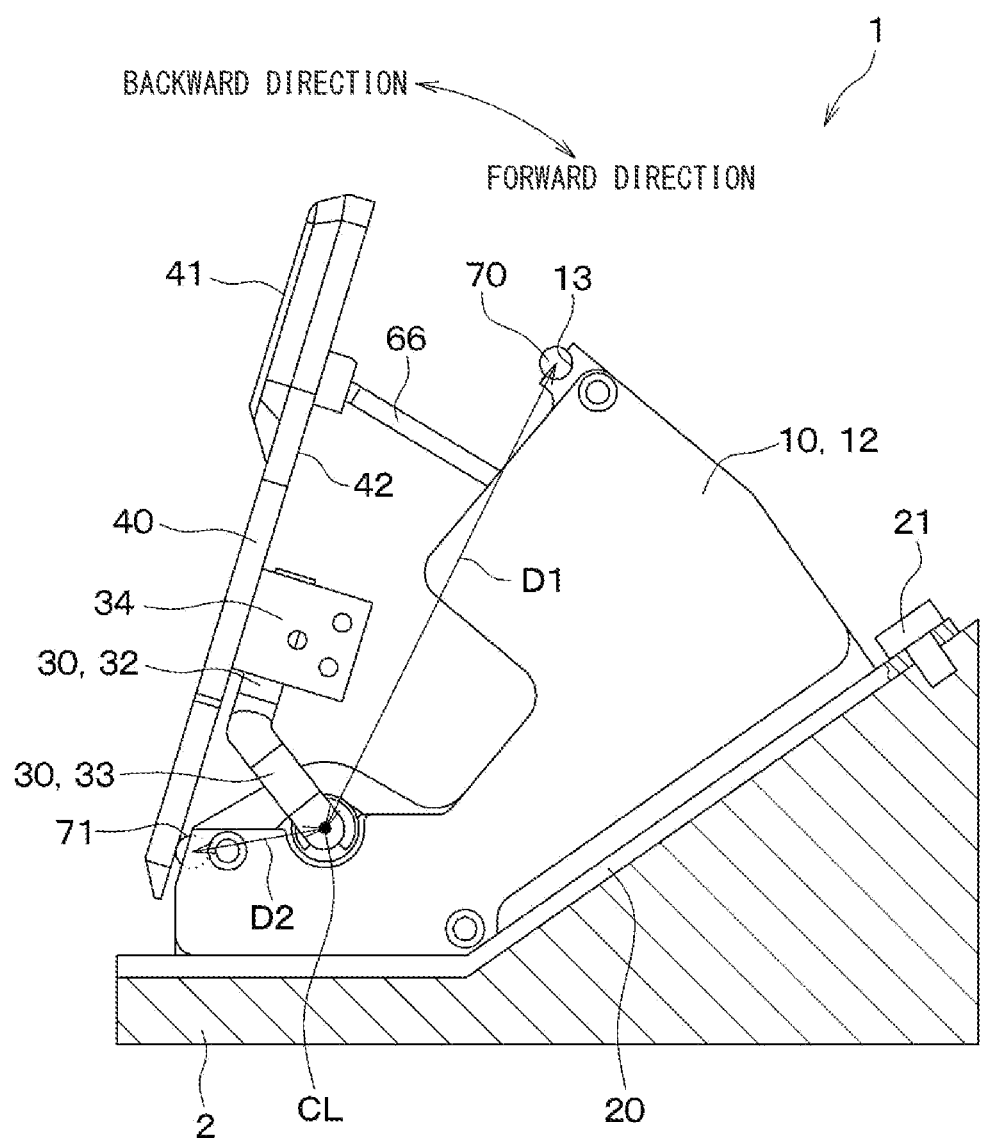
FIG. 5 is a right side view of the pedal device when being viewed in a direction V of FIG. 3.
Figure 6:
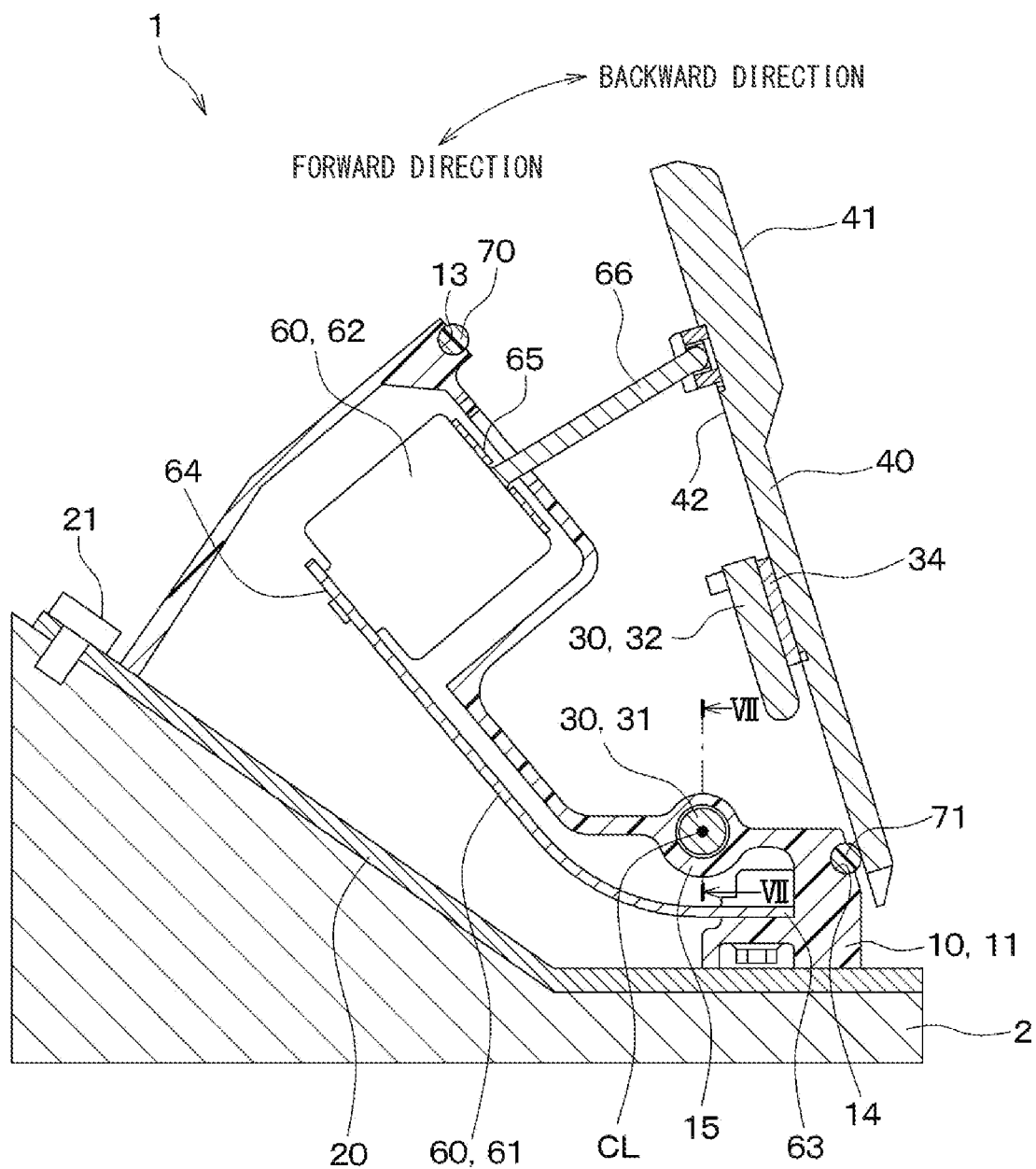
FIG. 6 is a cross-sectional view of the pedal device taken along a line VI-VI of FIG. 3.

As shown in FIGS. 4 to 6, the housing body 11 is attached to a portion of a vehicle body via a base plate 20. Specifically, the housing body 11 is attached to a floor 2 in an interior of the vehicle, to a dash panel, or the like via the base plate 20. The dash panel is a partition wall that separates the interior of the vehicle from an exterior such as an engine room of the vehicle, and is sometimes called as a bulkhead.

The base plate 20 is provided on the surface of the housing body 11 opposite to the pedal pad 40. The base plate 20 extends continuously from a portion on a front side of the vehicle to a portion on a rear side of the vehicle in the housing body 11. The base plate 20 is fixed to the floor 2 or the dash panel of the vehicle by bolts 21 or the like. The base plate 20 is made of a material having a higher strength than the housing body 11, such as metal. Therefore, the base plate 20 has a function of increasing the rigidity of the housing body 11 (for example, the rigidity of the outer wall provided with the first recess 13 and the second recess 14, and a shaft receiving portion 15 and its surroundings, which are described later).

Figure 2:
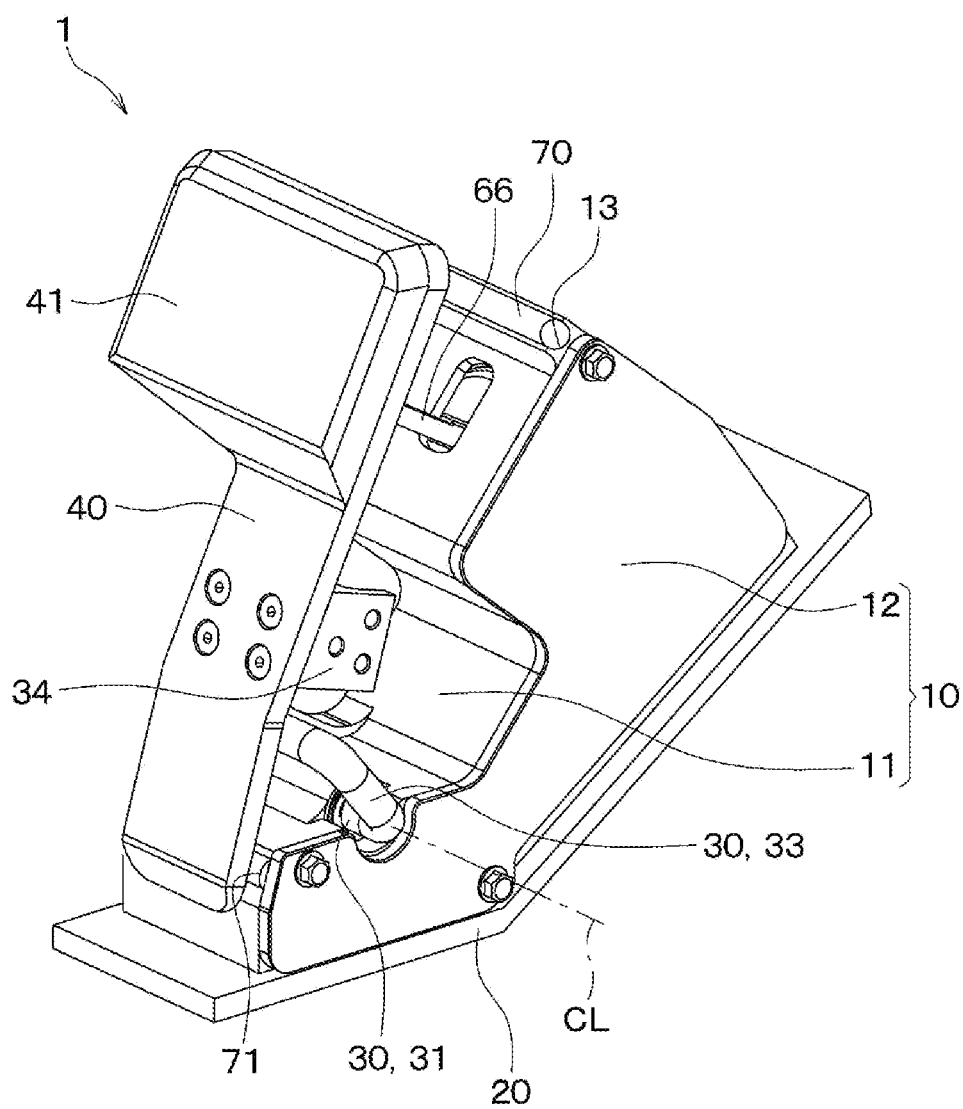
FIG. 2 is a perspective view showing a state in which a pedal pad is at an initial angle in the pedal device according to the first embodiment.
Figure 3:
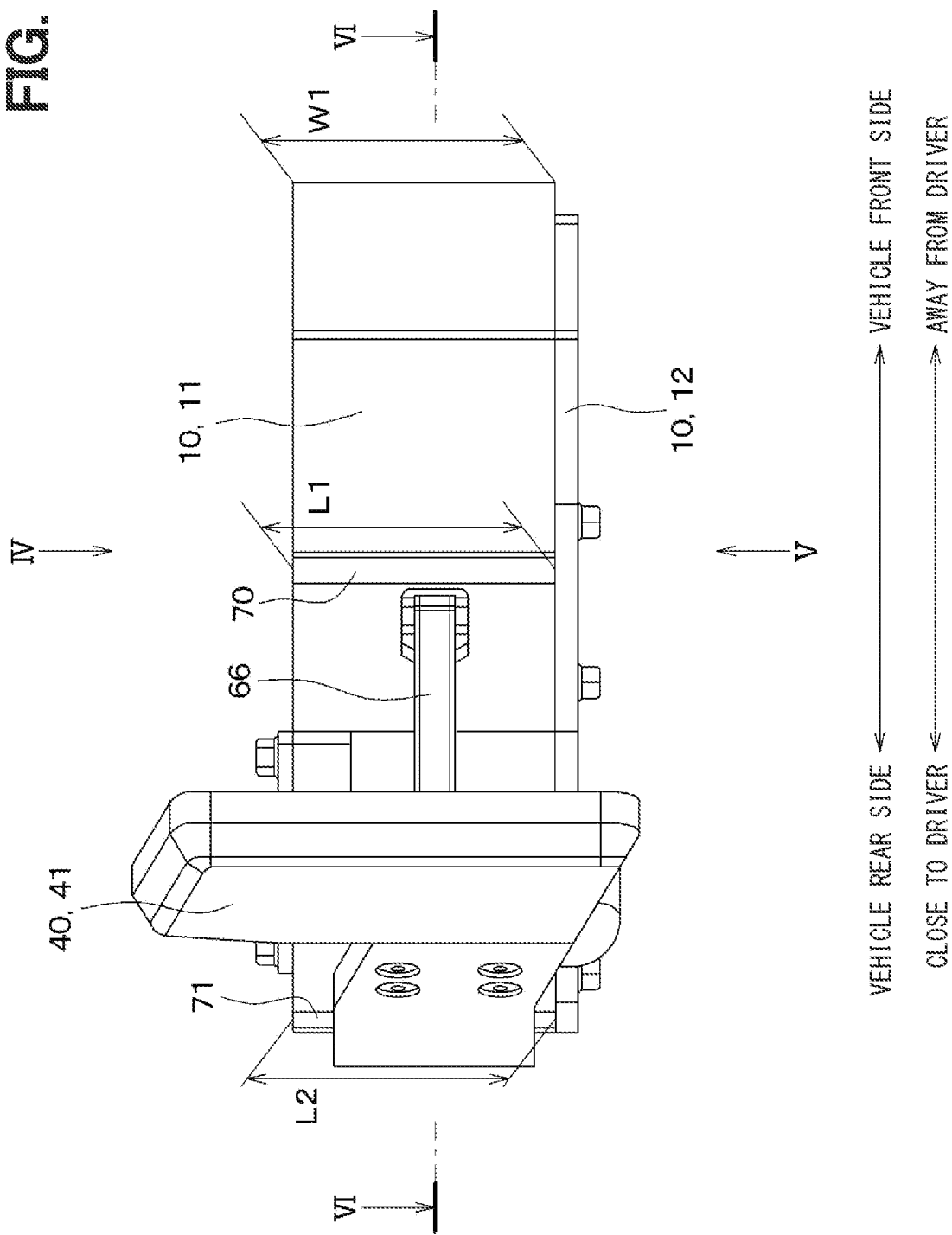
FIG. 3 is a plan view showing a state in which the pedal pad is at the initial angle in the pedal device according to the first embodiment.
Figure 7:
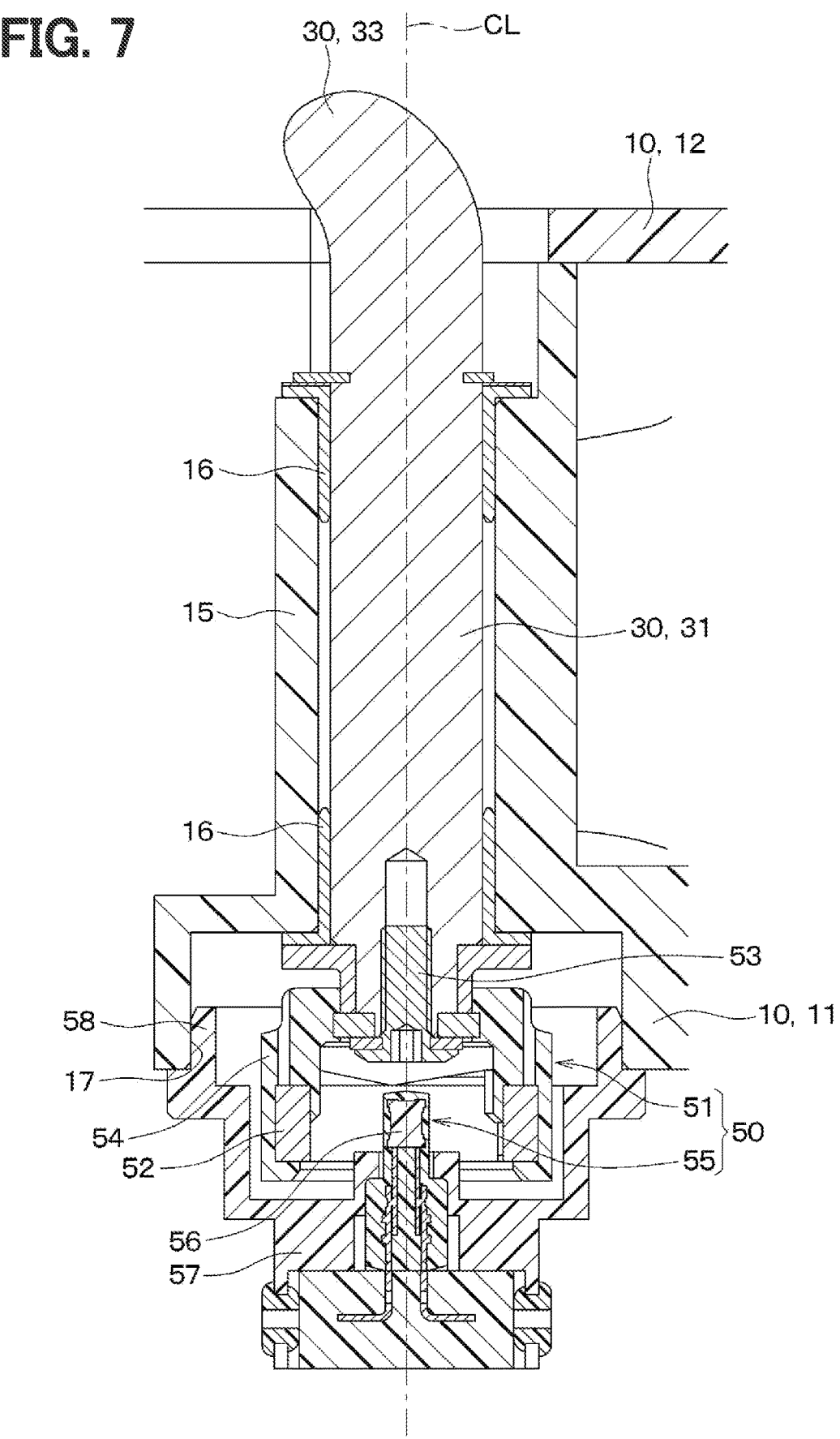
FIG. 7 is a cross-sectional view of the pedal device taken along a line VII-VII of FIG. 6.

As shown in FIGS. 6 and 7, inside the housing body 11, a space is formed in which the sensor unit 50, a reaction force generating mechanism 60, and the like are provided. As shown in FIGS. 2, 3 and 7, the housing cover 12 is provided on a side surface of the housing body 11 and closes a side opening of a space formed inside the housing body 11.

As shown in FIG. 7, the housing body 11 is provided with a shaft receiving portion 15 for rotatably supporting a shaft 30. The shaft 30 is rotatably supported by the shaft receiving portion 15. Specifically, a cylindrical bearing 16 for supporting the shaft 30 is attached to the shaft receiving portion 15, and the shaft 30 is supported by the bearing 16. Therefore, the shaft 30 can rotate about the center of a hole of the shaft receiving portion 15 (that is, the center of the bearing 16) as the rotation axis CL. The shaft 30 is supported only by the shaft receiving portion 15 provided on the housing body 11, and is not supported by the housing cover 12.

As shown in FIGS. 2 and 7, the shaft 30 has a shape obtained by bending a column shape metal, for example, multiple times, and has a shaft portion 31, a fixing portion 32 and a connecting portion 33. The shaft portion 31 is a portion that extends parallel to the center line of the shaft receiving portion 15 (that is, the rotation axis CL of the shaft 30) and is arranged in the shaft receiving portion 15. The fixing portion 32 is a portion that is non-rotatably fixed to the pedal pad 40. In the present embodiment, the fixing portion 32 is attached to a fixing bracket 34 provided on the surface of the pedal pad 40 opposite to a surface that receives the pedaling force of the driver (hereinafter referred to as "back surface 42 of the pedal pad 40"). The connecting portion 33 is a portion that connects the shaft portion 31 and the fixing portion 32. Since the shaft 30 has the shaft portion 31, the fixing portion 32, and the connecting portion 33, the rotation axis CL of the shaft 30 and the pedal pad 40 are arranged at positions separated from each other, and the sensor unit 50 is easily arrangeable in the space around the rotation axis CL.

As shown in FIGS. 2 to 6, the pedal pad 40 is made of metal, resin, or the like in a plate-like shape, and is arranged obliquely with respect to the floor 2. Specifically, the pedal pad 40 is obliquely arranged so that an upper end thereof faces the front of the vehicle and a lower end thereof faces the rear of the vehicle. A thick portion 41 is provided on an upper portion of the pedal pad 40 as a portion to be stepped on by the driver. The thick portion 41 is arranged above the rotation axis CL in the vertical direction of the vehicle. Note that arrangement of the pedal pad 40 is not limited to the one shown in the drawing, and may also be arranged substantially perpendicular to the floor 2, for example.

As described above, the back surface 42 of the pedal pad 40 and the fixing portion 32 of the shaft 30 are fixed by the fixing bracket 34. Therefore, the pedal pad 40 rotates about the same rotation axis CL as the shaft 30. That is, the rotation axis CL of the pedal pad 40 and the rotation axis CL of the shaft 30 are the same. The pedal pad 40 rotates in forward and backward directions within a predetermined angle range about the rotation axis CL in response to an increase or decrease in the pedaling force of the driver. In the following description, the direction in which the pedal pad 40 rotates as the driver's pedaling force applied to the pedal pad 40 increases is referred to as the forward direction, and the pedal pad 40 rotates as the driver's pedaling force applied to the pedal pad 40 decreases is referred to as the backward direction.

FIGS. 2 to 6 show a state in which the pedaling force of the driver is not applied to the pedal pad 40. The angle of the pedal pad 40 when the pedaling force of the driver is not applied to the pedal pad 40 is called as an initial angle or a full-close angle. Note that the initial angle and the full-close angle of the pedal pad 40 may also be referred to as a zero point. In a state in which the pedal pad 40 is at the initial angle, the rotation axis CL of the pedal pad 40 and the shaft 30 is positioned at an away position from the driver with respect to a portion of the pedal pad 40 at the same height as the rotation axis CL and a portion below the rotation axis CL (that is, a portion of the pedal pad 40 on one side closer to the floor 2). In other words, when the pedal pad 40 is at the initial angle, the rotation axis CL of the pedal pad 40 and the shaft 30 is positioned at a separate position relative to the portion of the pedal pad 40 at the same height as the rotation axis CL and the lower portion thereof are located far away in front of the vehicle. Therefore, it is possible to attach the sensor unit 50 on and around the rotation axis CL of the pedal pad 40 and the shaft 30.

Figure 8:
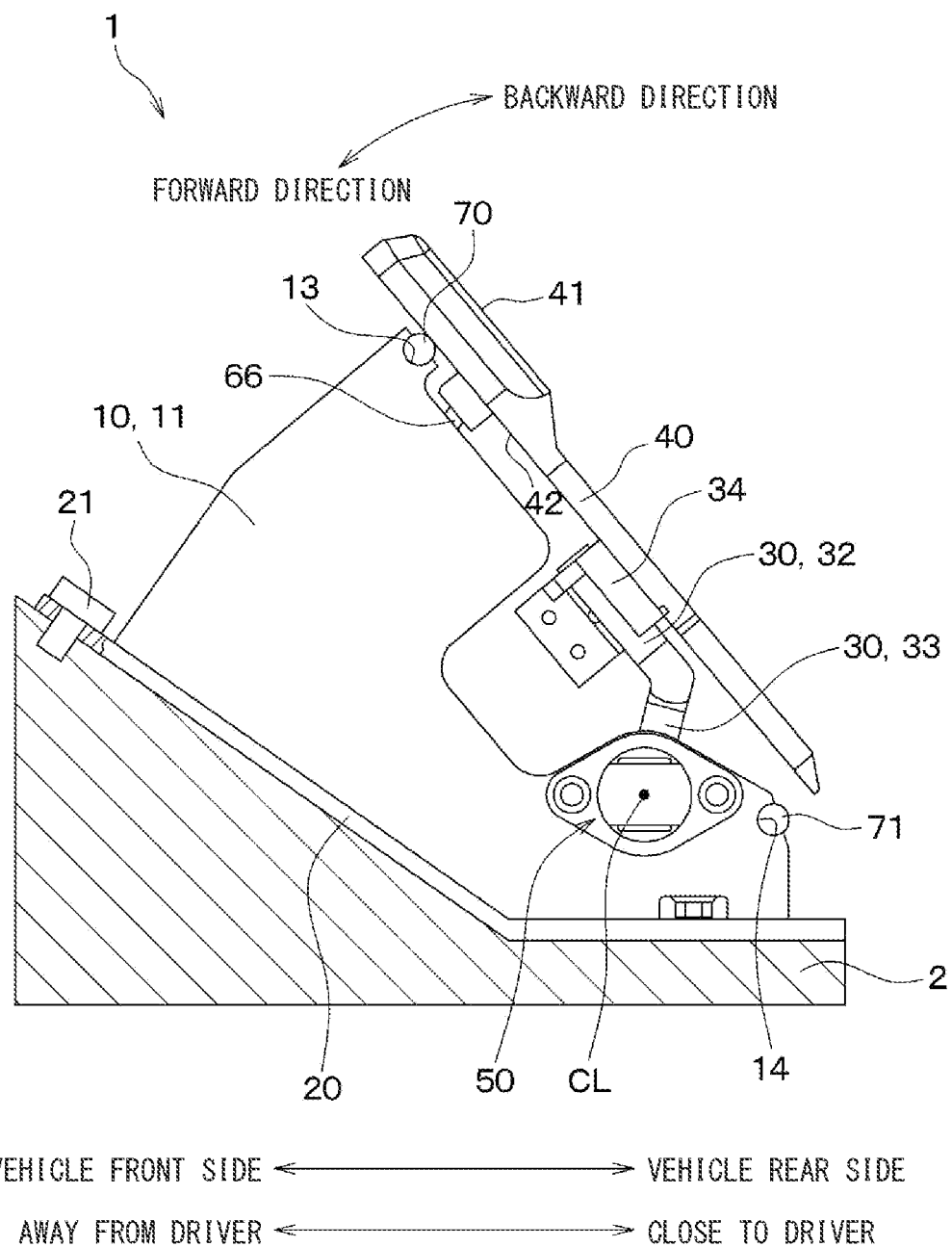
FIG. 8 is a left side view showing a state in which the pedal pad is at a maximum rotation angle in the pedal device according to the first embodiment.
Figure 9:
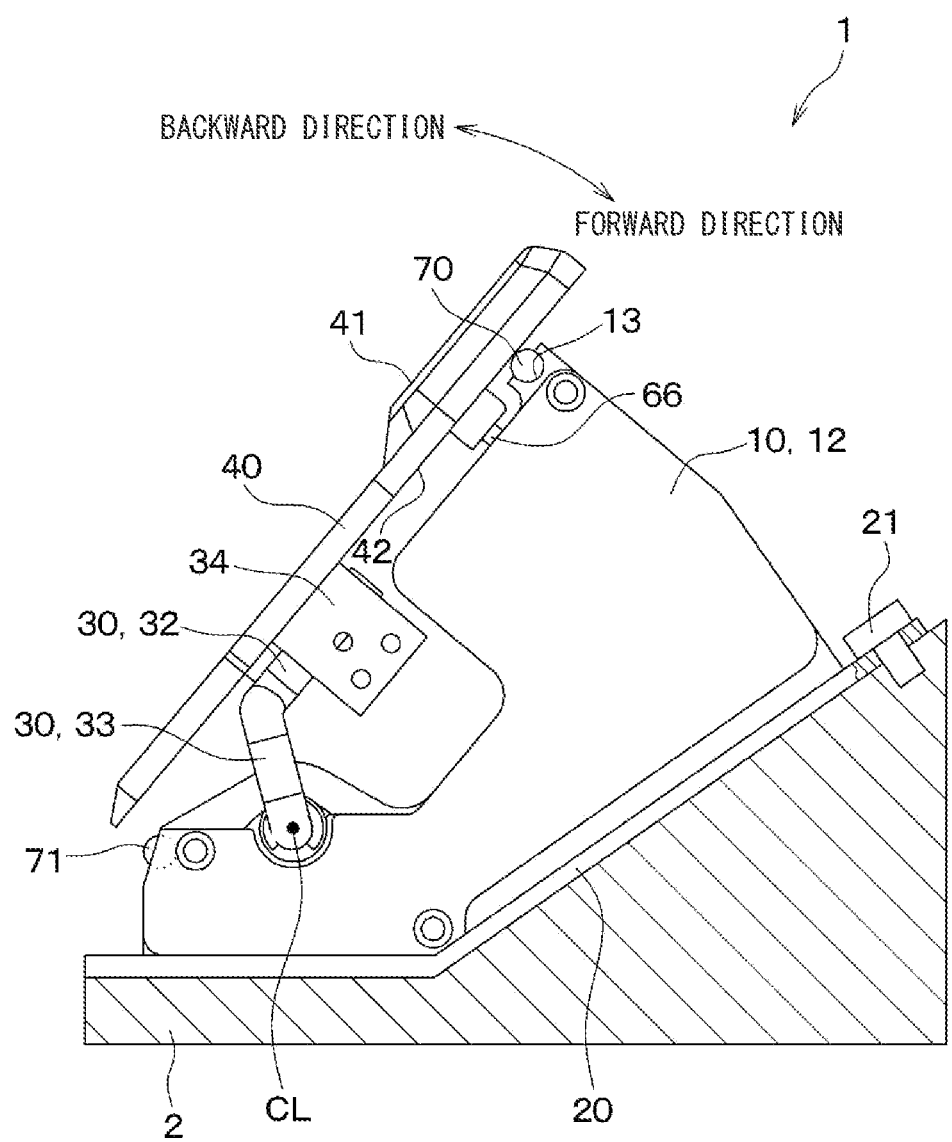
FIG. 9 is a right side view showing a state in which the pedal pad is at the maximum rotation angle in the pedal device according to the first embodiment.

On the other hand, FIGS. 8 and 9 show a state in which the pedaling force of the driver is applied to the pedal pad 40, and the pedal pad 40 is rotated to the maximum in the forward direction. The maximum rotation angle of the pedal pad 40 due to an increase in the pedaling force of the driver on the pedal pad 40 is called as the maximum rotation angle or a full-open angle.

A portion of the pedal pad 40 in front of the vehicle relative to the rotation axis CL rotates toward the floor 2 or toward the dash panel as the driver's pedaling force increases. As shown in FIGS. 4 and 5, the portion of the pedal pad 40 in front of the vehicle relative to the rotation axis CL rotates upward or toward the driver as the pedaling force of the driver decreases.

As shown in FIG. 6, the reaction force generating mechanism 60 is provided in the housing 10 to generate a reaction force against the pedaling force applied to the pedal pad 40 by the driver. Since the pedal device 1 includes the reaction force generating mechanism 60, even when a mechanical connection between the pedal pad 40 and the master cylinder 126 is eliminated, the same reaction force as the one when a mechanical connection with the master cylinder 126 is maintained (i.e., when the hydraulic reaction force is obtained) is obtainable.

In the present embodiment, the reaction force generating mechanism 60 is composed of, for example, a leaf spring 61 and one or more coil springs (not shown) provided inside a holder 62. By configuring the reaction force generating mechanism 60 with one or more elastic members, it is possible to form a predetermined pedaling force characteristic according to the rotation angle of the pedal pad 40.

The leaf spring 61 is bent to form a convex curved surface toward the floor 2 when not receiving a load. One end 63 of the leaf spring 61 is arranged between the rotation axis CL of the shaft 30 and the pedal pad 40 and the base plate 20, and is fixed to the housing 10 or to the base plate 20. On the other hand, the holder 62 is fixed to an other end 64 of the leaf spring 61. The leaf spring 61 is arranged to bend along an imaginary plane perpendicular to the rotation axis CL of the pedal pad 40. Therefore, when the leaf spring 61 receives a load from the holder 62, the portion of the leaf spring 61 on the other end 64 where the holder 62 is fixed bends toward the base plate 20.

The holder 62 is formed in a cylindrical shape with a bottom. Although not shown, one or more coil springs or the like are provided inside the holder 62. A lid member 65 is provided at one end of the holder 62 close to the pedal pad 40. The lid member 65 is provided to be able to reciprocate inside the holder 62 as the coil spring provided inside the holder 62 expands and contracts. The lid member 65 and the pedal pad 40 are connected by a connecting rod 66. One end of the connecting rod 66 and the pedal pad 40 are rotatably connected, and an other end of the connecting rod 66 and the lid member 65 are also rotatably connected. With such a configuration, when the driver applies a pedaling force to the pedal pad 40 and the pedal pad 40 rotates toward the housing 10, a load is applied from the pedal pad 40 to each member of the reaction force generating mechanism 60 via the connecting rod 66. Therefore, the leaf spring 61 and the coil spring that constitute the reaction force generating mechanism 60 generate a reaction force against the pedaling force applied to the pedal pad 40 by the driver. The configurations of the reaction force generating mechanism 60 and the connecting rod 66 are not limited to those illustrated above, and various configurations can be adopted.

As described above, the pedal device 1 of the present embodiment is configured such that the pedal pad 40 and the shaft 30 rotate about the same rotation axis CL. Therefore, the amount of step-on operation of the pedal pad 40 (that is, the rotation angle of the pedal pad 40) by the driver to control the travel of the vehicle is the same as the rotation angle of the shaft 30. The rotation angle of the pedal pad 40 and the shaft 30 is directly detected by the sensor unit 50 provided on or around the rotation axis CL of the shaft 30. In the following description, the rotation angle of pedal pad 40 and the shaft 30 is referred to as a "pedal rotation angle."

As shown in FIG. 7, the sensor unit 50 has a rotating portion 51 provided on the shaft 30 and a signal output portion 55 provided on the housing 10 for outputting a signal corresponding to a phase of the rotating portion 51. The rotating portion 51 includes, for example, a magnetic circuit 52 formed in a cylindrical shape by a magnet and a yoke, and a holding portion 54 that holds the magnetic circuit 52. The rotating portion 51 is fixed to one end of the shaft 30 by a bolt 53 or the like, and rotates together with the shaft 30. In the present embodiment, the center of rotation of the rotating portion 51 and the rotation axis CL of the shaft 30 are the same. The magnetic circuit 52 forming the rotating portion 51 forms a magnetic field in which a magnetic flux flows to intersect the rotation axis CL of the shaft 30.

On the other hand, the signal output portion 55 includes one or more Hall ICs 56, a sensor holder 57 for molding the Hall ICs 56, and the like. The Hall IC 56 has a Hall element and an integrated circuit for amplifying a signal output from the Hall element. The Hall IC 56 outputs an electric signal corresponding to a density of magnetic flux passing through a magneto-sensitive surface of the Hall element. When the rotating portion 51 rotates about the rotation axis CL together with the shaft 30, the density of magnetic flux passing through the magneto-sensitive surface of the Hall element of the Hall IC 56 changes. Therefore, the signal output portion 55 outputs an electric signal corresponding to the rotation angle of the pedal pad 40 and the shaft 30 (that is, the pedal rotation angle).

An opening 17 for installing a signal output portion 55 is provided in the housing 10 at a position corresponding to one end of the shaft 30. On the other hand, the sensor holder 57 of the signal output portion 55 is provided with a protrusion 58 that fits into an inner wall surface of the opening 17 provided in the housing 10. By fitting an outer wall surface of the protrusion 58 provided on the sensor holder 57 of the signal output portion 55 to the inner wall surface of the opening portion 17 provided in the housing 10, a sensor center of the signal output portion 55 and the rotation axis CL of the shaft 30 are coaxially assembled with each other.

The sensor unit 50 outputs an electric signal corresponding to the pedal rotation angle to the ECU of the vehicle in any state of the pedal pad 40. That is, when the pedal pad 40 is at the initial angle, the sensor unit 50 outputs an electric signal indicating that angle to the ECU of the vehicle. Further, when the pedal pad 40 is at the maximum rotation angle, the sensor unit 50 outputs an electric signal indicating that angle to the ECU of the vehicle.

As shown in FIGS. 2 to 6, 8 and 9, the initial angle and the maximum rotation angle of the pedal pad 40 are defined by the full-close stopper 71 and the full-open stopper 70, respectively. The full-close stopper 71 is attached to the second recess 14 provided in a portion of the outer wall of the housing body 11 close to the driver with respect to the rotation axis CL of the pedal pad 40 (that is, a portion on the rear side of the vehicle). That is, the full-close stopper 71 is provided on the outer wall of the housing 10 at a portion of the pedal pad 40 close to the driver with respect to the rotation axis CL of the pedal pad 40 (that is, at a portion on the rear side of the vehicle). As shown in FIGS. 2 to 6, the full-close stopper 71 is arranged in the vertical direction of the vehicle with respect to the rotation axis CL on the back surface 42 of the pedal pad 40 when the pedaling force of the driver is not applied to the pedal pad 40, and stops the pedal pad 40 from further rotating in the backward direction. Thereby, the full-close stopper 71 defines the initial angle of the pedal pad 40.

On the other hand, the full-open stopper 70 is attached to the first recess 13 provided in the outer wall of the housing body 11 at a portion away from the driver with respect to the rotation axis CL of the pedal pad 40 (that is, a portion on the front side of the vehicle). That is, the full-open stopper 70 is provided at a portion of the outer wall of the housing 10 away from the driver with respect to the rotation axis CL of the pedal pad 40 (that is, at a portion on the front side of the vehicle). As shown in FIGS. 8 and 9, when the driver's pedaling force on the pedal pad 40 increases, the full-open stopper 70 contacts an upper part of the back surface 42 of the pedal pad 40 with respect to the rotation axis CL in the vertical direction of the vehicle, and stops the forward rotation of the pedal pad 40. Thereby, the full-open stopper 70 defines the maximum rotation angle of the pedal pad 40.

In the present embodiment, the full-close stopper 71 and the full-open stopper 70 have the same shape, size and material. The full-close stopper 71 and the full-open stopper 70 are so shaped that surfaces that come into contact with the pedal pad 40 are curved surfaces that protrude toward the pedal pad 40. Specifically, the full-close stopper 71 and the full-open stopper 70 of the present embodiment are formed in a column shape or in a cylindrical shape. The material of the full-open stopper 70 and the full-close stopper 71 is non-metal (specifically, resin or rubber) at least at the portions that come into contact with the pedal pad 40. Note that the full-close stopper 71 and the full-open stopper 70 of the present embodiment are all made of non-metal (specifically, resin or rubber).

As shown in FIG. 3, a length L1 of the full-open stopper 70, a length L2 of the full-close stopper 71, and a width W1 of the housing body 11 are the same. The length L1 of the full-open stopper 70, the length L2 of the full-close stopper 71, and the width W1 of the housing body 11 are all distances in a direction parallel to the rotation axis CL of the pedal pad 40.

As shown in FIG. 5, a distance D1 between the center of the full-open stopper 70 and the rotation axis CL is longer than a distance D2 between the center of the full-close stopper 71 and the rotation axis CL. Specifically, the full-open stopper 70 is provided at a position as far as possible from the rotation axis CL of the pedal pad 40 on the wall surface of the housing body 11 facing the pedal pad 40. On the other hand, the full-close stopper 71 is provided at a position where it can come into contact with the back surface 42 of the pedal pad 40 at a portion of the housing body 11 below the rotation axis CL in the vertical direction of the vehicle.

Figure 10:
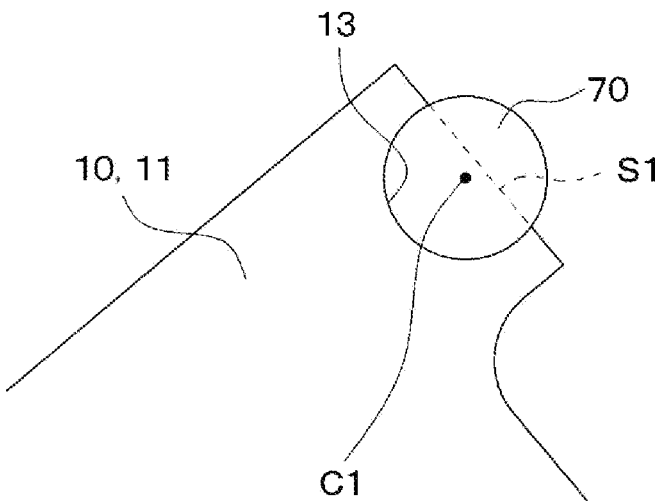
FIG. 10 is an enlarged view of a X portion of FIG. 4.

As shown in FIG. 10, the full-open stopper 70 has a column shape or in a cylindrical shape, so that a cross section thereof perpendicular to the rotation axis CL of the pedal pad 40 is circular. The inner wall of the first recess 13 provided in the housing body 11 is formed with substantially the same shape and size as a portion of the outer shape of the full-open stopper 70 that comes into contact therewith. Therefore, the first recess 13 holds the full-open stopper 70 to partially cover its outer shape. The full-open stopper 70 is attached to the first recess 13 in a state in which half or more of the circular area of the cross-sectional shape is buried inside the first recess 13. In other words, a center C1 of the circular cross-sectional shape of the full-open stopper 70 is arranged inside the first recess 13 with respect to an opening surface S1 of the first recess 13 facing the pedal pad 40. As a result, the full-open stopper 70 can be easily assembled to the first recess 13, and the full-open stopper 70 can be prevented from falling out of the first recess 13.

Figure 11:
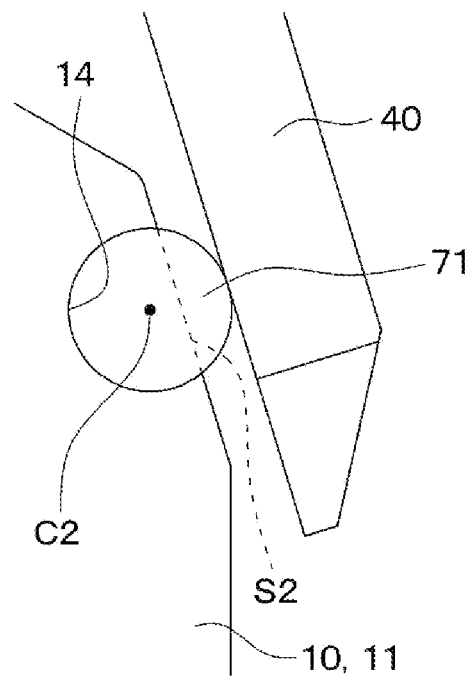
FIG. 11 is an enlarged view of an XI portion of FIG. 4.

As shown in FIG. 11, the full-close stopper 71 also has a column shape or a cylindrical shape, so that a cross section perpendicular to the rotation axis CL of the pedal pad 40 is circular. The inner wall of the second recess 14 provided in the housing body 11 is formed with substantially the same shape and size as a portion of the outer shape of the full-close stopper 71 that contacts therewith. Therefore, the second recess 14 holds the full-close stopper 71 to partially cover its outer shape. The full-close stopper 71 is attached to the second recess 14 in such a manner that half or more of the area of the circular cross-section is buried inside the second recess 14. In other words, a center C2 of the circular cross section of the full-close stopper 71 is arranged inside the second recess 14 with respect to an opening surface S2 of the second recess 14 facing the pedal pad 40. In such manner, the full-close stopper 71 can be easily assembled to the second recess 14 and the full-close stopper 71 can be prevented from falling out of the second recess 14.

In the configuration of the pedal device 1 of the first embodiment described above, the back surface 42 of the pedal pad 40 and the full-close stopper 71 are brought into contact with each other when the driver's pedaling force is not applied to the pedal pad 40, preventing further rotation of the pedal pad 40 in the backward direction. In such manner, the initial angle of the pedal pad 40 is defined. When the pedal pad 40 is at the initial angle, the sensor unit 50 outputs an electric signal indicating such an angle to the ECU 110 of the vehicle.

When the pedaling force of the driver is applied to the pedal pad 40, the pedal pad 40 rotates about the rotation axis CL. The sensor unit 50 outputs an electric signal corresponding to the rotation angle of pedal pad 40 to the ECU 110 of the vehicle. The ECU 110 drives and controls the brake circuit 120 to generate the hydraulic pressure necessary for braking the vehicle, and the hydraulic pressure drives the brake pads to decelerate or stop the vehicle.

When the driver's pedaling force applied to the pedal pad 40 increases and the back surface 42 of the pedal pad 40 contacts the full-open stopper 70, the forward rotation of the pedal pad 40 is stopped. Thereby, the maximum rotation angle of the pedal pad 40 is defined. When the pedal pad 40 is at the maximum rotation angle, the sensor unit 50 outputs an electric signal indicating the angle to the ECU 110 of the vehicle. At this time as well, the ECU 110 drives and controls the brake circuit 120 to generate the hydraulic pressure necessary for braking the vehicle, and the hydraulic pressure drives the brake pads to decelerate or stop the vehicle.

The pedal device 1 of the first embodiment described above has the following effects.

(1) The full-close stopper 71 included in the pedal device 1 of the present embodiment is provided at a portion of the outer wall of the housing 10 that is close to the driver with respect to the rotation axis CL. The full-close stopper 71 contacts a portion of the back surface 42 of the pedal pad 40 below the rotation axis CL in the vertical direction when the pedal pad 40 is mounted on the vehicle when the pedaling force of the driver is not applied to the pedal pad 40, preventing or stopping further rotation of the pedal pad 40 in the backward direction. According to the above, the initial angle of the pedal pad 40 is defined by the full-close stopper 71. The present embodiment has a simple structure in which the full-close stopper 71 and the pedal pad 40 are in direct contact with each other, and the number of parts is small, thereby making it easy to assemble and adjust the parts. Therefore, the pedal device 1 can suppress product-to-product variations in the initial angle of the pedal pad 40, and can accurately define the initial angle of the pedal pad 40. Therefore, the pedal device 1 prevents an error from occurring in the electric signal output from the sensor unit 50 when the driver does not apply the pedaling force to the pedal pad 40 and when application of the pedaling force is started, thereby achieving an accurate vehicle control.

By the way, the pedal device described in Patent Document 1 shown as the prior art document has a structure in which a stopper and a restrictor for defining the initial angle of the pedal pad are provided inside the housing. As such, in the pedal device described in Patent Document 1, those components are not visible from outside of the housing when those or related components are damaged or worn. On the other hand, in the pedal device 1 of the present embodiment, the full-close stopper 71 is provided on the outer wall of the housing 10. Therefore, the presence or absence of contact between the full-close stopper 71 and the pedal pad 40 can be easily visually confirmable during manufacturing, inspection, maintenance, or the like of the pedal device 1.

(2) The full-open stopper 70 included in the pedal device 1 of the present embodiment is provided at a portion of the outer wall of the housing 10 that is away from the driver with respect to the rotation axis CL. When the driver's pedaling force on the pedal pad 40 increases, the full-open stopper 70 comes into contact with a portion of the back surface 42 of the pedal pad 40 that is above the rotation axis CL in the vertical direction when the pedal pad 40 is mounted on the vehicle, thereby preventing the pedal pad 40 from rotating further in the forward rotation. According to the above, in the pedal device 1 of the present embodiment, it is possible to easily visually confirm whether or not the full-open stopper 70 and the pedal pad 40 are in contact during manufacturing, inspection, maintenance, or the like.

(3) In the present embodiment, the full-open stopper 70 and the full-close stopper 71 have non-metallic portions in contact with the pedal pad 40. According to the above, it is possible to reduce a sound when the full-open stopper 70 and the pedal pad 40 come into contact with each other. Also, noise generated when the full-close stopper 71 and the pedal pad 40 come into contact is reducible.

(4) In the present embodiment, portions of the full-open stopper 70 and the full-close stopper 71 in contact with the pedal pad 40 are made of resin or rubber. According to the above, specific materials for the full-open stopper 70 and the full-close stopper 71 are exemplified.

(5) In the present embodiment, the surfaces of the full-open stopper 70 and the full-close stopper 71 that come into contact with the pedal pad 40 are convex curved surfaces toward the pedal pad 40. According to the above, the surfaces of the full-open stopper 70 and the full-close stopper 71 contacting in a curved shape with the pedal pad 40 in a planar shape are linear, and the amount of crushing due to the load acting from the pedal pad 40 is small, making it easy to adjust a stop position of the pedal pad 40. Therefore, the pedal device 1 can suppress product-to-product variations in the initial angle of the pedal pad 40, and can accurately define the initial angle of the pedal pad 40. The full-open stopper 70 and the full-close stopper 71 of the present embodiment are less likely to deteriorate over time as compared with the full-open stopper 70 and the full-close stopper 71 having spherical surfaces. Further, the full-open stopper 70 and the full-close stopper 71 of the present embodiment do not require adjustment of the contact surface compared to the case where the full-open stopper 70 and the full-close stopper 71 have a rectangular parallelepiped shape, thereby making it easy to adjust the stop position of the pedal pad 40.

(6) In the present embodiment, the full-open stopper 70 and the full-close stopper 71 are columnar or cylindrical. According to the above, the full-open stopper 70 and the full-close stopper 71 have no orientation in the circumferential direction when assembled to the housing 10, enabling ease of assembly. That is, there is no variation in the initial angle of the pedal pad 40 due to a difference in the assembly direction of the full-close stopper 71 (that is, no need to worry about the circumferential direction of the full-close stopper 71 in assembly). Therefore, the pedal device 1 can suppress product-to-product variations in the initial angle of the pedal pad 40, and an accurate initial angle of the pedal pad 40 is definable.

(7) In the present embodiment, the full-open stopper 70 and the full-close stopper 71 are identical in shape, size and material. According to the above, the types of parts used as the full-open stopper 70 and the full-close stopper 71 is reducible when manufacturing the pedal device 1, thereby reducing the manufacturing cost.

(8) In the present embodiment, the distance D1 between the center of the full-open stopper 70 and the rotation axis CL is longer than the distance D2 between the center of the full-close stopper 71 and the rotation axis CL. According to the above, by increasing the distance D1 between the center of the full-open stopper 70 and the rotation axis CL, the load that the full-open stopper 70 receives from the pedal pad 40 is reducible when the driver's pedaling force on the pedal pad 40 increases. On the other hand, the load received by the full-close stopper 71 is less than the one received by the full-open stopper 70, since the load of the full-close stopper 71 comes into contact with the pedal pad 40 when the pedaling force of the driver is not applied to the pedal pad 40. Therefore, the full-close stopper 71 can be arranged at a position closer to the rotation axis CL. By providing such an arrangement, it is possible to suppress aging deterioration of the full-open stopper 70 and the full-close stopper 71.

(9) In the present embodiment, the width W1 of the housing body 11, the length L1 of the full-open stopper 70, and the length L2 of the full-close stopper 71 are the same. According to the above, the surface pressure acting from the pedal pad 40 to the full-open stopper 70 is reducible, and the surface pressure acting from the full-open stopper 70 to the housing 10 is reducible. Further, the surface pressure acting from the pedal pad 40 to the full-close stopper 71 is reducible, and the surface pressure acting from the full-close stopper 71 to the housing 10 is reducible. Therefore, aging deterioration of the full-open stopper 70 and the full-close stopper 71 is suppressible.

(10) In the present embodiment, the full-open stopper 70 has a circular cross section perpendicular to the rotation axis CL, and half or more of the circular area is buried inside the first recess 13. The full-close stopper 71 has a circular cross section perpendicular to the rotation axis CL, and half or more of the circular area is buried inside the second recess 14. This makes it possible to easily assemble the full-open stopper 70 and the full-close stopper 71 to the housing 10, and to prevent the full-open stopper 70 and the full-close stopper 71 from falling out of the housing 10.

(11) In the present embodiment, the pedal device 1 includes the base plate 20 provided on the surface of the housing 10 opposite to the pedal pad 40. The housing is fixed to the vehicle body via the base plate 20. According to the above, the rigidity of the housing 10 is increased by providing the base plate 20 between the housing 10 and the vehicle body. Therefore, the deformation of the walls of the housing 10 to which the full-open stopper 70 and the full-close stopper 71 are attached is prevented. Therefore, the pedal device 1 can suppress product-to-product variations in the initial angle of the pedal pad 40, and an accurate initial angle of the pedal pad 40 is definable. Further, by increasing the rigidity of the housing 10, deformation of the shaft receiving portion 15 that rotatably supports the shaft 30 in the housing 10 is preventable. Therefore, the pedal device 1 can prevent positional deviation between the rotating portion 51 and the signal output portion 55 of the sensor unit 50, thereby achieving a higher detection accuracy of the pedal rotation angle.

Second Embodiment

The following describes the second embodiment of the present disclosure. The second embodiment includes changes in the structure of a full-close stopper 71 and a full-open stopper 70 with respect to the first embodiment, with other part remaining the same as that of the first embodiment. Thus, the following description mainly focuses on such difference.

Figure 12:
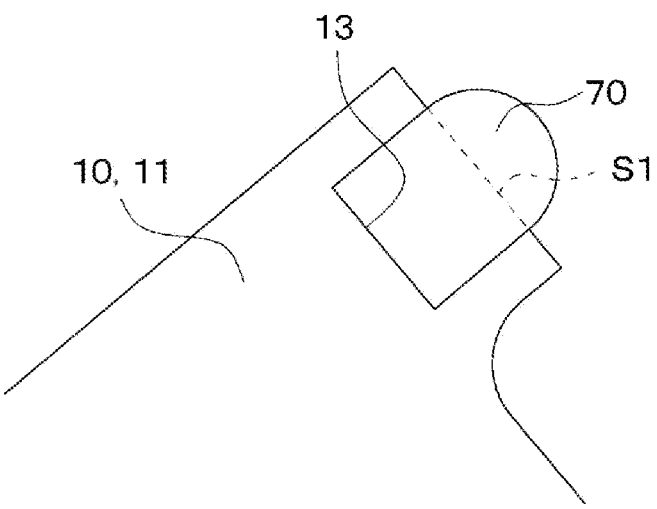
FIG. 12 is an enlarged view of a full-open stopper and its proximity provided in a pedal device according to a second embodiment.
Figure 13:
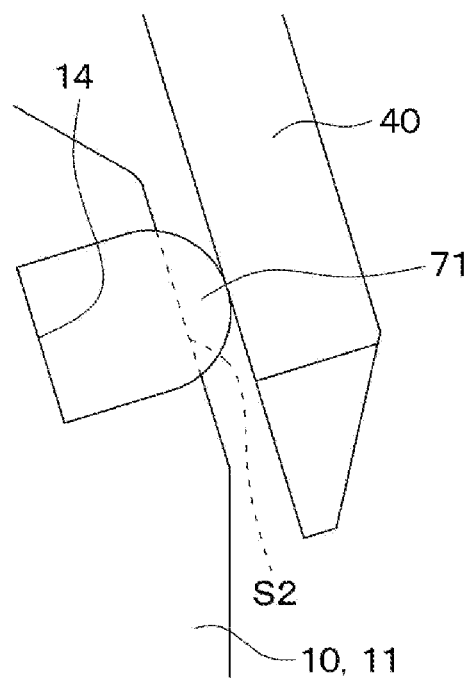
FIG. 13 is an enlarged view of a full-close stopper and its proximity provided in the pedal device according to the second embodiment.

As shown in FIGS. 12 and 13, in the second embodiment, the full-close stopper 71 and the full-open stopper 70 have the same shape, size and material. The full-close stopper 71 and the full-open stopper 70 are so shaped that surfaces that come into contact with a pedal pad 40 are curved surfaces that protrude toward the pedal pad 40. Specifically, the full-close stopper 71 and the full-open stopper 70 have cross sections that are a combination of a square and a semi-circle that has a convex curve surface on one side close to the pedal pad 40.

In the second embodiment, the length L1 of the full-open stopper 70, the length L2 of the full-close stopper 71, and the width W1 of the housing body 11 are the same. Further, the material of the full-open stopper 70 and the full-close stopper 71 is non-metallic (specifically, resin or rubber) at least at the portions that come into contact with the pedal pad 40. Note that, in the second embodiment, the full-close stopper 71 and the full-open stopper 70 are all made of non-metal (specifically, resin or rubber).

As shown in FIG. 12, a first recess 13 provided in a housing body 11 has a shape that partially covers the outer shape of the full-open stopper 70. In the cross-sectional shape of the full-open stopper 70, the square portion is buried inside the first recess 13, and the semi-circular portion is arranged closer to the pedal pad 40 than an opening surface S1 of the first recess 13.

As shown in FIG. 13, a second recess 14 provided in the housing body 11 also has a shape that partially covers the outer shape of the full-close stopper 71. The square portion of the cross-sectional shape of the full-close stopper 71 is buried inside the second recess 14, and the semi-circular portion is arranged closer to the pedal pad 40 than an opening surface S2 of the second recess 14.

The pedal device 1 of the second embodiment described above can also achieve the same effects as those of the first embodiment.

Third Embodiment

The following describes the third embodiment of the present disclosure. The third embodiment does not have the base plate 20 compared to the first embodiment and the like, and is otherwise the same as the first embodiment and the like. Here, different parts different from the first embodiment and the like are mainly described.

Figure 14:
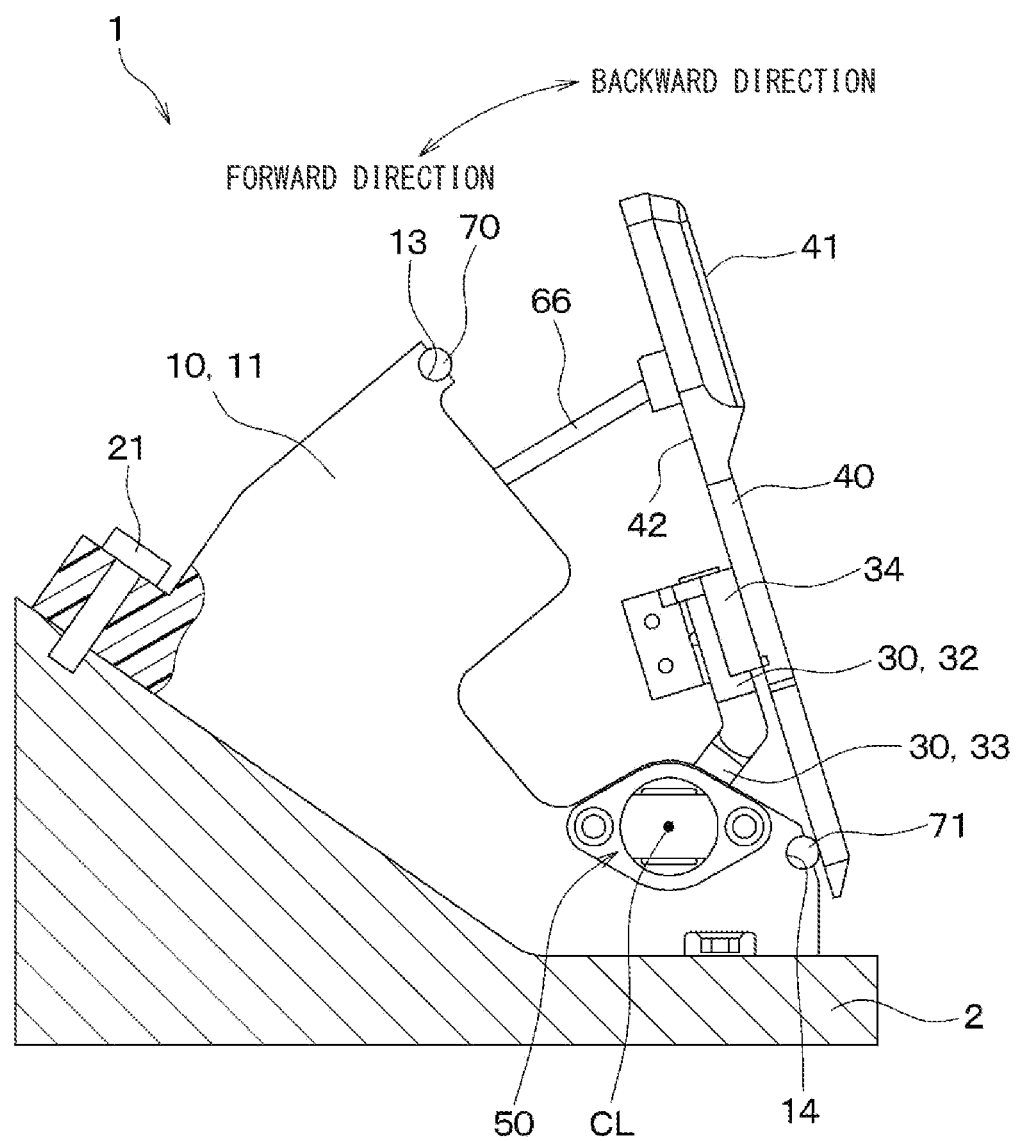
FIG. 14 is a left side view of a pedal device according to a third embodiment.

As shown in FIG. 14, a pedal device 1 does not have a base plate in the third embodiment. Therefore, a housing 10 provided in the pedal device 1 is directly attached to a floor 2 or a dash panel in a passenger compartment of a vehicle with bolts 21 or the like. The third embodiment described above can also achieve the same effects as the first embodiment, because both embodiments have the similar configuration. Also, in the third embodiment, the number of parts of the pedal device 1 can be reduced.

Other Embodiments (1) In each of the above embodiments, the brake pedal device has been described as an example of the pedal device 1, but the present disclosure is not limited to the above. For example, the pedal device 1 can also be an accelerator pedal device. Alternatively, the pedal device 1 can be various devices that are operated by the driver's foot.

(2) In each of the above embodiments, the shape, size, and material of the full-open stopper 70 and the full-close stopper 71 are the same, but the present disclosure is not limited to the above. For example, the shape, size and material of the full-open stopper 70 and the full-close stopper 71 may be different from each other.

(3) In each of the above embodiments, the length L1 of the full-open stopper 70, the length L2 of the full-close stopper 71, and the width W1 of the housing body 11 are set to be the same, but the present disclosure is not limited to the above. The length L1 of the full-open stopper 70, the length L2 of the full-close stopper 71, and the width W1 of the housing body 11 may be respectively different.

(4) In each of the above-described embodiments, the shape of the full-open stopper 70 and the full-close stopper 71 is columnar, cylindrical, or a combination of a square and a semi-circle in cross section, but the shape is not limited to the above. Various shapes can be adopted for the full-close stopper 71 and the full-open stopper 70. For example, the full-close stopper 71 and the full-open stopper 70 may have spherical, rectangular parallelepiped, polygonal, or a combination of polygonal and curved surfaces.

(5) In each of the above-described embodiments, the configuration in which the full-open stopper 70 and the full-close stopper 71 are attached to the first recess 13 and the second recess 14 provided in the housing 10 has been described, but the configuration is not limited to the above. Various methods can be adopted for mounting the full-open stopper 70 and the full-close stopper 71. For example, a method of inserting a protrusion provided on one of the full-open stopper 70 or the housing 10 into a hole provided on the other of the full-open stopper 70 or the housing 10 may be used. Alternatively, a protrusion provided on one of the full-close stopper 71 or the housing 10 may be inserted into a hole provided on the other of the full-close stopper 71 or the housing 10. Alternatively, the full-open stopper 70 and the full-close stopper 71 may be attached to the housing 10 using screws, adhesive, or the like.

(6) In each of the above embodiments, as an example of the pedal device 1, the pedal pad 40 and the master cylinder 126 are not mechanically connected, but the present disclosure is not limited to the above. The pedal device 1 may be one in which the pedal pad 40 and the master cylinder 126 are mechanically connected. In such case, the pedal device 1 may be configured to generate a reaction force against the pedaling force applied to the pedal pad 40 by the master cylinder 126 without the reaction force generating mechanism 60.

(7) In each of the above-described embodiments, as an example of the reaction force generating mechanism 60, a combination of the leaf spring 61 and a plurality of coil springs has been described, but the present disclosure is not limited to the above. The reaction force generating mechanism 60 may be composed of, for example, one or more coil springs, or may be composed of one or more leaf springs 61.

(8) In each of the embodiments described above, the configuration in which the sensor unit 50 is arranged on and near the rotation axis CL has been described, but the configuration is not limited to the above. The sensor unit 50 may be provided at a position away from the rotation axis CL. For example, the sensor unit 50 can be provided on a member that operates in conjunction with the pedal pad 40, such as the reaction force generating mechanism 60.

(9) In each of the above-described embodiments, a configuration in which the brake-by-wire system 100 uses the master cylinder 126 to generate the hydraulic pressure in the brake fluid flowing through the brake circuit 120, but the configuration is not limited to the above. For example, the brake-by-wire system 100 may be configured to use a hydraulic pump to generate the hydraulic pressure in the brake fluid flowing through the brake circuit 120.

(10) In the first embodiment, the ECU 110 is composed of the first ECU 111 and the second ECU 112, but the present disclosure is not limited to the above. One ECU or three or more ECUs may be used.

The present disclosure is not limited to the above-described embodiments, and can be appropriately modified. The above-described embodiments are not independent of each other, and can be appropriately combined together except when the combination is obviously impossible. Further, individual elements or features of a particular embodiment are not necessarily essential unless it is specifically stated that the elements or the features are essential in the foregoing description, or unless the elements or the features are obviously essential in principle. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Furthermore, a shape, positional relationship or the like of a structural element, which is referred to in the embodiments described above, is not limited to such a shape, positional relationship or the like, unless it is specifically described or obviously necessary to be limited in principle.

What is claimed is:

1. A pedal device, to be mounted on a vehicle, the pedal device comprising:
    a housing attached to a vehicle body;
    a pedal pad provided rotatably about a predetermined rotation axis with respect to the housing, to rotate in a forward direction with an increase in a pedaling force of a driver and to rotate in a backward direction with a decrease in the pedaling force of the driver, wherein a stepped portion of the pedal pad, stepped on by the driver, is arranged above the rotation axis in a vertical direction of the vehicle;
    a sensor unit configured to output an electric signal corresponding to a rotation angle of the pedal pad; and
    a full-close stopper provided at a portion of an outer wall of the housing closer to the pedal pad than a position of the rotation axis, and configured to come into contact with a lower part of the pedal pad in the vertical direction of the vehicle to prevent the pedal pad from rotating in the backward direction, when the pedaling force of the driver is not applied to the pedal pad.

2. The pedal device according to claim 1, further comprising:
    a full-open stopper provided at a portion of the outer wall of the housing away from the driver with respect to the rotation axis, and configured to come into contact with an upper portion of the pedal pad in the vertical direction of the vehicle to prevent the pedal pad from rotating in the forward rotation, when the pedaling force of the driver on the pedal pad increases.

3. The pedal device according to claim 2, wherein the full-open stopper and the full-close stopper have non-metallic portions that come into contact with the pedal pad.

4. The pedal device according to claim 2, wherein the full-open stopper and the full-close stopper have resin portions or rubber portions that come into contact with the pedal pad.

5. The pedal device according to claim 2, wherein the full-open stopper and the full-close stopper have curved surfaces protruding toward the pedal pad, and the curved surfaces are configured to come into contact with the pedal pad.

6. The pedal device according to claim 2, wherein the full-open stopper and the full-close stopper respectively have a column shape or a cylindrical shape.

7. The pedal device according to claim 2, wherein the full-open stopper and the full-close stopper are same in a shape, a size or a material.

8. The pedal device according to claim 2, wherein the housing has a housing body and a housing cover, and a width of the housing body, a length of the full-open stopper, and a length of the full-close stopper are same in a direction parallel to the rotation axis.

9. The pedal device according to claim 2, wherein the housing has a first recess configured to attach the full-open stopper and a second recess configured to attach the full-close stopper,
    the full-open stopper has a circular cross section perpendicular to the rotation axis, and half or more of a circular area of the circular section of the full-open stopper is buried inside the first recess, and
    the full-close stopper has a circular cross section perpendicular to the rotation axis, and half or more of a circular area of the circular cross section of the full-close stopper is buried inside the second recess.

10. The pedal device according to claim 2, further comprising:
    a base plate provided on a surface of the housing opposite to the pedal pad, wherein
    the housing is fixed to the vehicle body via the base plate.

11. A pedal device to be mounted on a vehicle, the pedal device comprising: a housing attached to a vehicle body;
    a pedal pad provided rotatably about a predetermined rotation axis with respect to the housing, to rotate in a forward direction with an increase in a pedaling force of a driver and to rotate in a backward direction with a decrease in the pedaling force of the driver, wherein a stepped portion of the pedal pad, stepped on by the driver, is arranged above the rotation axis in a vertical direction of the vehicle;

a sensor unit configured to output an electric signal corresponding to a rotation angle of the pedal pad;

a full-close stopper configured to come into contact with a lower part of the pedal pad in the vertical direction of the vehicle to prevent the pedal pad from rotating in the backward direction, when the pedaling force of the driver is not applied to the pedal pad; and a full-open stopper provided at a portion of the outer wall of the housing away from the driver with respect to the rotation axis, and configured to come into contact with an upper portion of the pedal pad in the vertical direction of the vehicle to prevent the pedal pad from rotating in the forward rotation, when the pedaling force of the driver on the pedal pad increases, wherein a distance between a center of the full-open stopper and the rotation axis is greater than a distance between a center of the full-close stopper and the rotation axis.

12. The pedal device according to claim 11, wherein the full-open stopper and the full-close stopper have non-metallic portions that come into contact with the pedal pad.

13. The pedal device according to claim 11, wherein the full-open stopper and the full-close stopper have resin portions or rubber portions that come into contact with the pedal pad.

14. The pedal device according to claim 11, wherein the full-open stopper and the full-close stopper have curved surfaces protruding toward the pedal pad, and the curved surfaces are configured to come into contact with the pedal pad.

15. The pedal device according to claim 11, wherein the full-open stopper and the full-close stopper respectively have a column shape or a cylindrical shape.

16. The pedal device according to claim 11, wherein the full-open stopper and the full-close stopper are same in a shape, a size or a material.

17. The pedal device according to claim 11, wherein the housing has a housing body and a housing cover, and a width of the housing body, a length of the full-open stopper, and a length of the full-close stopper are same in a direction parallel to the rotation axis.

18. The pedal device according to claim 11, wherein the housing has a first recess configured to attach the full-open stopper and a second recess configured to attach the full-close stopper, the full-open stopper has a circular cross section perpendicular to the rotation axis, and half or more of a circular area of the circular section of the full-open stopper is buried inside the first recess, and the full-close stopper has a circular cross section perpendicular to the rotation axis, and half or more of a circular area of the circular cross section of the full-close stopper is buried inside the second recess.

19. The pedal device according to claim 11, further comprising:

a base plate provided on a surface of the housing opposite to the pedal pad, wherein the housing is fixed to the vehicle body via the base plate.

20. The pedal device according to claim 11, wherein the full-close stopper is configured to separate from the lower part of the pedal pad when the pedaling force of the driver on the pedal pad increases.

21. A pedal device to be mounted on a vehicle, the pedal device comprising:

a housing attached to a vehicle body;

a pedal pad provided rotatably about a predetermined rotation axis with respect to the housing, to rotate in a forward direction with an increase in a pedaling force of a driver and to rotate in a backward direction with a decrease in the pedaling force of the driver, wherein a stepped portion of the pedal pad, stepped on by the driver, is arranged above the rotation axis in a vertical direction of the vehicle;

a sensor unit configured to output an electric signal corresponding to a rotation angle of the pedal pad;

a full-close stopper provided at a portion closer to the pedal pad than the rotation axis, and configured to come into contact with a lower part of the pedal pad in the vertical direction of the vehicle to prevent the pedal pad from rotating in the backward direction, when the pedaling force of the driver is not applied to the pedal pad; and a full-open stopper provided at a portion of the outer wall of the housing away from the driver with respect to the rotation axis, and configured to come into contact with an upper portion of the pedal pad in the vertical direction of the vehicle to prevent the pedal pad from rotating in the forward rotation, when the pedaling force of the driver on the pedal pad increases.

\* \* \* \* \*